B. B. HARDIN.
WHEEL.
APPLICATION FILED APR. 8, 1911.
1,071,314. Patented Aug. 26, 1913.
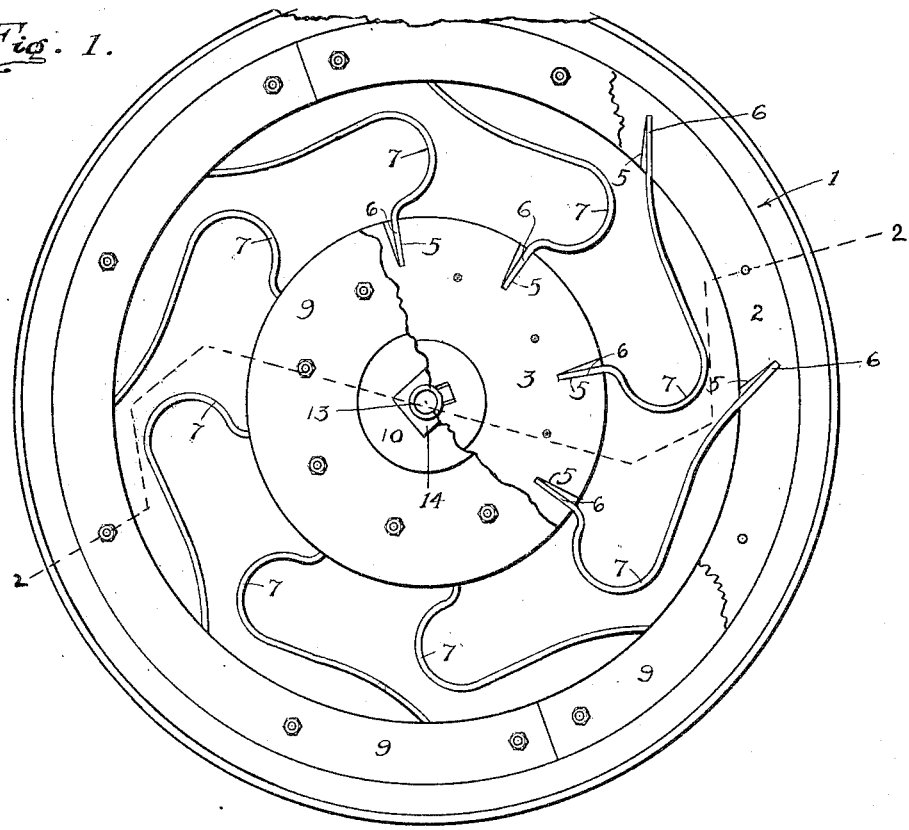
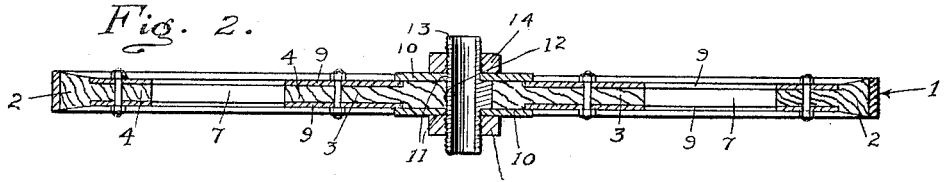
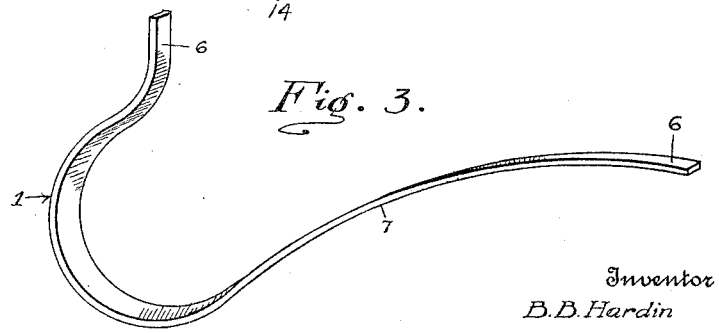
Witnesses
Inventor
B. B. Hardin
Attorney

UNITED STATES PATENT OFFICE.

BENJIMAN BARNETT HARDIN, OF CLAIREMONT, TEXAS, ASSIGNOR OF ONE-HALF TO BEN C. HARDIN, OF CLAIREMONT, TEXAS.

WHEEL.

1,071,314.  Specification of Letters Patent.  Patented Aug. 26, 1913.

Application filed April 8, 1911. Serial No. 619,895.

*To all whom it may concern:*

Be it known that I, BENJIMAN B. HARDIN, a citizen of the United States, residing at Clairemont, in the county of Kent and State of Texas, have invented certain new and useful Improvements in Wheels; and I do hereby declare the following to be a full, clear, and exact description of the invention, such as will enable others skilled in the art to which it appertains to make and use the same.

This invention relates to new and useful improvements in wheels and more particularly to that class known as spring or resilient wheels.

The object of this invention is to improve and simplify devices of this character, rendering them comparatively simple and inexpensive to manufacture, reliable and efficient in use and readily operated.

With the above and other objects in view this invention resides in the novel features of construction, formations, combinations and arrangement of parts to be hereinafter more fully described, claimed and illustrated in the accompanying drawings in which—

Figure 1 is a side elevation of my improved wheel partly in section. Fig. 2 is a section taken on the line 2—2 of Fig. 1, and Fig. 3 is a detail perspective view of one of the spring spokes.

Referring to the drawings by characters of reference the numeral 1 designates generally my improved spring wheel, consisting of a rim 2 spaced outwardly apart from a hub 3. The adjacent edges of hub and rim are reduced as at 4 and each provided with a series of spaced notches 5 which receive the oppositely extending terminals 6 of spring spokes 7. These spokes 7 are curved outwardly from the hub 3 almost to the inner periphery of the rim 2 at which joint they are curved in substantially parallel relation thereto for a suitable distance after which they are inserted into one of the notches 5. The hub and rim which are reduced as at 4 have bolted or otherwise secured to the opposite sides thereof rings 9 which prevent the displacement of the said spokes 7. Locking plates 10 are located upon either side of the hub 2 and have formed therein concentric openings 11 through which and through the aperture 12 formed centrally of the hub is passed a tubular member 13 oppositely threaded at its ends for the reception of locking nuts 14 which securely clasp the parts in their respective positions.

From the foregoing disclosure taken in connection with the drawings it will be obvious that a wheel of the class described is provided for, which will fulfil all of the necessary requirements of such a device.

Having thus fully described this invention what I claim and desire to protect by Letters Patent is:

In a resilient wheel, a hub having an edge of reduced lateral width provided with a plurality of spaced radial V-shaped notches, a rim spaced outwardly apart from the hub and provided with V-shaped notches opening toward the hub interiorly thereof, and inclined relatively to the radius of said wheel, spokes formed of flat spring metal, each of said spokes being bent intermediate its ends into a substantially semicircular contour, one of the terminals of each of said spokes being bent outwardly at substantially right angles to the semicircular portion and having its extremity engaging one of the notches in said hub, the other terminal of each spoke being inclined outwardly on a curved line and engaging one of the notches in the rim, rings engaging the reduced portions of the rim and hub to prevent the displacement of the spokes, plates centrally engaging the sides of the hub and each having its outer edges overlapping the inner edges of the rings aforesaid.

In testimony whereof I affix my signature in presence of two witnesses.

BENJIMAN BARNETT HARDIN.

Witnesses:
 B. P. VARDIMAN,
 H. W. JOHNS.

Copies of this patent may be obtained for five cents each, by addressing the "Commissioner of Patents, Washington, D. C."